US007228308B2

(12) United States Patent
Rollins

(10) Patent No.: US 7,228,308 B2
(45) Date of Patent: Jun. 5, 2007

(54) METHOD AND SYSTEM FOR DIRECT LINKAGE OF A RELATIONAL DATABASE TABLE FOR DATA PREPARATION

(75) Inventor: John Baxter Rollins, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/706,731

(22) Filed: Nov. 12, 2003

(65) Prior Publication Data

US 2005/0102311 A1    May 12, 2005

(51) Int. Cl.
*G06F 17/00*    (2006.01)
*G06F 7/00*    (2006.01)

(52) U.S. Cl. .................... 707/101; 707/10; 707/102; 709/201

(58) Field of Classification Search ............ 707/1, 707/3, 10, 100–102, 203, 201, 213
See application file for complete search history.

(56) References Cited

U.S. PATENT DOCUMENTS

| | | | |
|---|---|---|---|
| 5,787,416 A | 7/1998 | Tabb et al. ................... 707/2 |
| 6,128,628 A | 10/2000 | Waclawski et al. ......... 707/203 |
| 6,356,897 B1 | 3/2002 | Gusack .......................... 707/4 |
| 6,438,549 B1 | 8/2002 | Aldred et al. .................. 707/9 |
| 6,519,601 B1 | 2/2003 | Bosch ........................ 707/100 |
| 6,728,726 B1 * | 4/2004 | Bernstein et al. ........ 707/103 R |
| 6,985,901 B1 * | 1/2006 | Sachse et al. ................. 707/10 |
| 7,047,232 B1 * | 5/2006 | Serrano .......................... 707/3 |
| 2003/0212960 A1 * | 11/2003 | Shaughnessy et al. ...... 715/526 |

OTHER PUBLICATIONS

1994 Database Buyer's Guide and Client/Server Sourcebook, The Gale Group, v.7, n.6 p. 63(29), Jun. 15, 1994.*
Dilorio et al., "Data About Data: An Introduction to Dictionary Tables", Proceedings of the Twenty-First Annual SAS Users Group, International Conference, SUGI 21, Pt. vol. 1, pp. 213-219, Published Cary, NC, USA, 1996.
Loren, "SAS Connections to DB2: Tools and Techniques", Proceedings of the Twenty-First Annual SAS Us rs Group, International Conference, SUGI 21, Pt. vol. 1, pp. 498-507, Published Cary, NC, USA, 1996.
Dickson et al., "Select Items from PROC.SQL Where Items>Basics", Proceedings of the Twenty-First Annual SAS Users Group, International Conference, SUGI 21, Pt. vol. 1, pp. 227-236, Published Cary, NC, USA, 1996.

(Continued)

*Primary Examiner*—Hosain Alam
*Assistant Examiner*—Susan Rayyan
(74) *Attorney, Agent, or Firm*—Duke W. Yee; John R. Pivnichny; Rakesh Garg

(57) ABSTRACT

A method, apparatus, and computer instructions for direct linkage of relational database table to a data preparation tool for data preparation. In a preferred embodiment, the mechanism of the present invention allows data to be read directly from one or more relational database tables to a data preparation tool into datasets without generating output flat files. Multiple datasets from different relational database table are merged into one dataset if more than one relational database table is read. Upon completion of necessary data preparation on the dataset by the data preparation tool, the present invention creates a new relational database table and loads resulting data from the prepared dataset into the new relational database table.

19 Claims, 5 Drawing Sheets

OTHER PUBLICATIONS

Crandall, "Building and Using %Window Applications in SAS", Proceedings of the Twenty-First Annual SAS Users Group, International Conference, SUGI 21, Pt. vol. 1, pp. 926-930, Published Cary, NC, USA, 1996.

McCaskell, "Looking for Mr. X Bar: Supporting Statistical Computing in the Personal Computer Era", Capitalizing on Communication, ACM SIGUCCS XVII, 1989, pp. 367-375.

Chiu et al., "A Robust and Scalable Clustering Algorithm for Mixed Type Attributes in Large Database Environment", ACM Digital Library, 2001, pp. 263-268.

IBM Technical Disclosure Bulletin, vol. 25, No. 11A, Apr. 1983, "Data Space Manager", pp. 5456-5459.

"Welcome to the IBM TPF Product Information Center", IBM TPF Product Information Center, pp. 1-3, (updated Sep. 2005) retrieved Jul. 12, 2006. http://publib.boulder.ibm.com/infocenter/tpfhelp/current/topic/com.ibm.tpf.doc/pichHome.html.

"Relational database tables", IBM Corporation, Red Brick Warehouse (last updated Mar. 2004), pp. 1-3, retrieved Jul. 10, 2006. http://publib.boulder.ibm.com/infocenter/rb63help/topic/com.ibm.redbrick.doc6.3/sqlrg/sqlrg12.htm.

Welcome to the IBM Red Brick Warehouse 6.34 Information Center, pp. 1-2, (updated Mar. 2004), retrieved Jul. 12, 2006. http://publib.boulder.ibm.com/infocenter/rb63help/topic/com.ibm.redbrick.doc6.3/welcome_rb63.htm.

"Understanding Virtual Storage Access Method (VSAM) database support", IBM TPF Product Information Center, 1 page, retrieved Jul. 10, 2006. http://publib.boulder.ibm.com/infocenter/tpfhelp/current/topic/com.ibm.ztpf.doc_put.02/gtpa2/gtpa2m2q.htm.

"VSAM concepts", pp. 1-2, retrieved Jul. 10, 2006. http://publib.boulder.ibm.com/infocenter/tpfhelp/current/topic/com.ibm.ztpf.doc_put.02/gtpa2/gtpa2m2r.htm.

"VSAM data support", pp. 1-14, retrieved Jul. 10, 2006. http://publib.boulder.ibm.com/infocenter/tpfhelp/current/topic/com.ibm.ztpf.doc_put.02/gtpa2/gtpa2m2s.htm.

Loren et al., "SAS Connections to DB2: Tools and Techniques", Proceedings of the Twenty-First Annual SAS Users Group International Conference, Chicago, Illinois Mar. 1996, pp. 498-507.

* cited by examiner

METHOD AND SYSTEM FOR DIRECT LINKAGE OF A RELATIONAL DATABASE TABLE FOR DATA PREPARATION

BACKGROUND OF THE INVENTION

1. Technical Field

The present invention relates generally to an improved data processing system and, in particular, to a method and system for improving a relational database system. Still more particularly, the present invention relates to a method, apparatus, and computer instructions for direct linkage of relational database tables and other files for data preparation.

2. Description of Related Art

In order to perform analysis on data currently existing in a relational database, system analysts utilize various data preparation tools in order to prepare data for utilization. For example, to "prepare" data for utilization, system analysts might clean, transform, and consolidate data into a format that is most suitable for analysis. These steps are examples of steps used to "prepare" the data for analysis. An example of a data preparation tool is SAS, available from SAS Institute, Inc. SAS Institute offers a set of enterprise software that allows system analysts to perform business functions, such as data warehousing, data mining, human resources management, financial management, and decision support, etc. SAS offerings include Base SAS and SAS/ACCESS software. Base SAS provides a SAS language, procedures and a macro facility for data analysis and reporting. SAS/ACCESS software provides an interface between Base SAS and various types of relational databases from different vendors, so that different relational database data may be accessed. One type of relational database includes DB2, a product available from International Business Machines Corporation.

In order to analyze data in SAS, input data has to be in SAS dataset format. A SAS dataset includes data values of a data object and variables that define characteristics of the data object. For example, 'Name' is a variable having data values of 'David' or 'John'. Currently, SAS includes functionality to load data from an existing SAS dataset into a relational database table by using a DATA step and a PROC step. The DATA step takes raw input data, for example, a SAS dataset, and computes values or applies conditional logic to the dataset to generate an output, such as a report. The PROC step takes a SAS dataset as an input, calls a group of SAS statements, and executes a procedure to analyze data in order to generate a report. The PROC step includes a DBLOAD function that creates a new relational database table and loads a SAS dataset into the newly created table.

The above functionality moves data only in one direction, that is, SAS can load a SAS dataset into a database table. If a user wants to move data in the other direction, that is, load database table data into a SAS dataset, then some other process must be used to take input data from a database table and create an SAS dataset for data preparation. A common process is for the user to manually write database table data into a flat file and write SAS code to read the file into a SAS dataset. This process requires a user to perform multiple steps including writing data to and reading data from an output flat file. These steps increase the time and effort needed to analyze data.

Therefore, it would be advantageous to have an improved method, apparatus, and computer instructions to directly link relational database table(s) and SAS dataset(s) in a simplified solution that moves data in both directions without the need to perform multiple steps to read and write data to an output flat file.

SUMMARY OF THE INVENTION

The present invention provides a method, apparatus, and computer instructions for direct linkage of relational database table to a data preparation tool for data preparation. In a preferred embodiment, the mechanism of the present invention allows data to be read directly from one or more relational database tables to a data preparation tool into datasets without generating output flat files as an intermediate step. Multiple datasets from different relational database tables are merged into one dataset if more than one relational database table is read. Upon completion of necessary data preparation on the dataset by the data preparation tool, the present invention creates a new relational database table and loads resulting data from the prepared dataset into the new relational database table.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
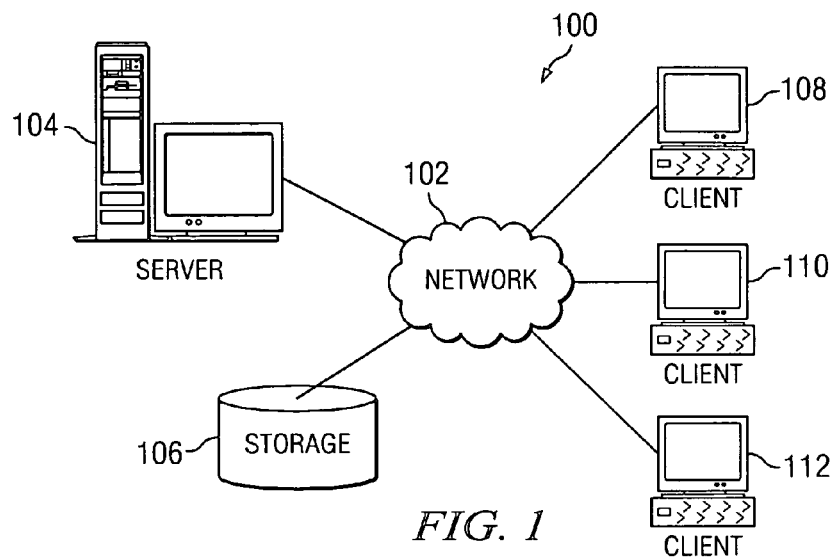
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100.

Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
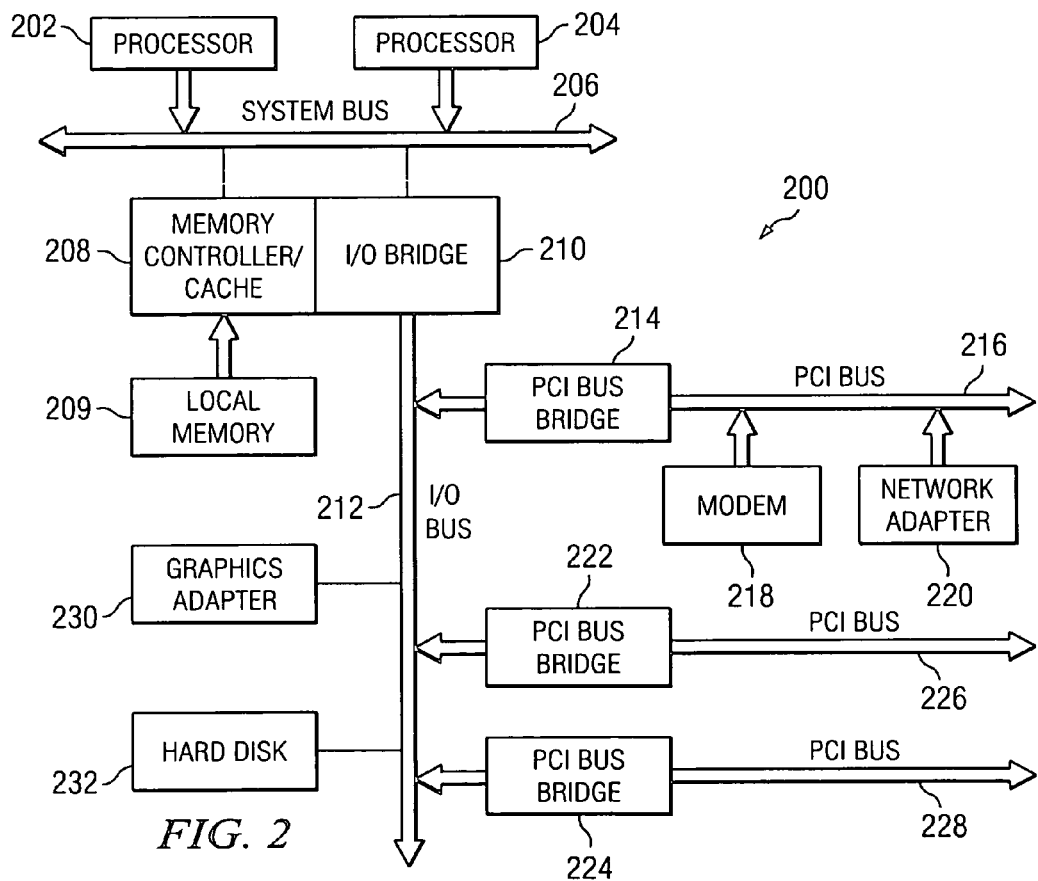
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINE-X operating system.

Figure 3:
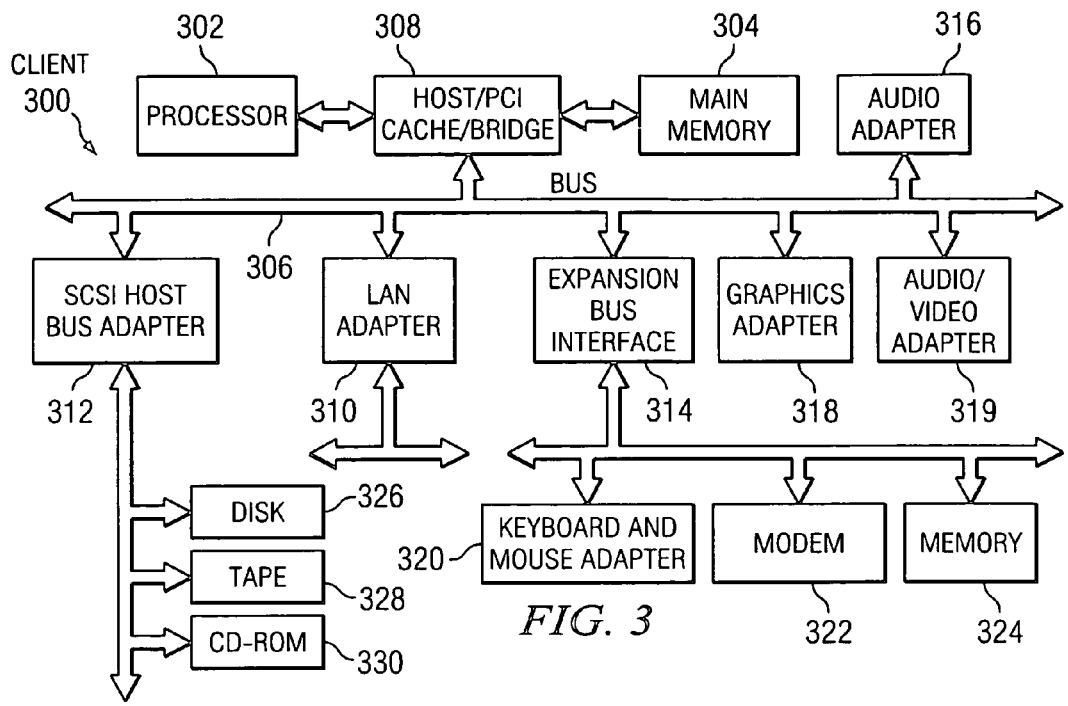
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for direct linkage of a relational database table to a data preparation tool for data preparation to place data into a form for analysis in the relational database. In a preferred embodiment, the mechanism of the present invention provides a direct linkage of a relational database table to a data preparation tool in order to read raw input data from a database table into a dataset, such as SAS dataset, without the need of generating an output flat file.

The mechanism of the present invention includes a single set of SAS procedure statements that reads raw input data by creating a temporary dataset and selecting data from the input database table. Specifically, the SAS procedure PROC SQL is used as the framework to set up the SQL commands to connect to a relational database, create a temporary SAS dataset, select the desired columns from the source database table, and disconnect from the database. For example, select tablename.columnname1, tablename.columnname 2 from tablename. In this example, tablename is the name of the database table and columnname1 and columnname 2 are names of the desired columns from tablename table.

If more than one database table is required, the mechanism of the present invention allows additional temporary datasets to be created and loaded with data from other database tables. Each database table has a corresponding temporary dataset.

In the illustrative example, once all of the selected data is read from database tables, the temporary datasets are merged into a single merged dataset. A user may perform additional data preparation. For example, adding values from one column of a database table to values of another column of the same database table. Data preparation may be performed either before or after merging datasets in order to produce the desired output data in these illustrative examples.

After the desired output dataset has been prepared, the mechanism of the present invention creates a new database table with the table name specified by the user and writes output data from the resulting dataset into the new database table. The new database table may reside in the same database or in a different type of database, as long as the database type is compatible with the data preparation tool.

Figure 4:
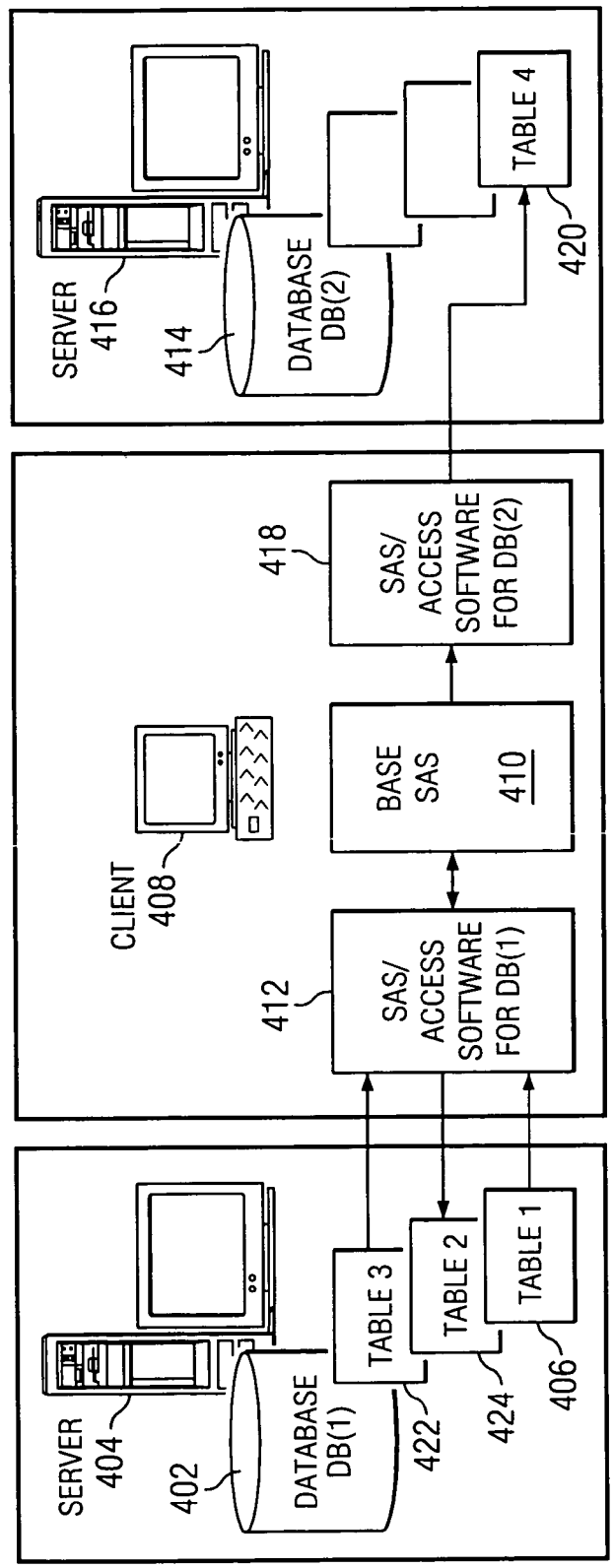
FIG. 4 is a diagram illustrating components for direct linkage of a relational database table to data preparation tool for data preparation in accordance with a preferred embodiment of the present invention.

Turning now to FIG. 4, a diagram illustrating components for direct linkage of a relational database table to a data preparation tool for data preparation is depicted in accordance with a preferred embodiment of the present invention. As depicted in FIG. 4, in this example implementation, database DB(1) 402 resides on server 404. Server 404 may be implemented as server, such as server 104 in FIG. 1. In the illustrative example, database DB(1) 402 includes table 1 406, though more than one table may be used.

The mechanism of the present invention may be implemented on a data processing system, such as client 408. Client 408 may be implemented as a data processing system, such as data processing system 200 in FIG. 2. In this example, a user executes a data preparation tool, such as Base SAS 410, on client 408 to analyze data. Base SAS 410, a product available from SAS Institute Inc., reads and transforms the input data and generates the desired output data for the user.

In order to retrieve data from a relational database table, the user uses an interface, such as SAS/ACCESS software, to read the data directly from the database table. SAS/ACCESS software, a product available from SAS Institute Inc., provides methods for accessing data from various types of databases made by different vendors. Different types of databases include, for example, DB2, a product available from International Business Machine Corporation, and Oracle, a product available from Oracle Corporation.

For each type of database, represented by database DB(1) 402, a corresponding SAS/ACCESS software is used to access data from a database table. In this example, SAS/ACCESS software for DB(1) 412 is used to access data from table 1 406. In this case, database DB(1) is a DB2 database. Thus, for a different type of database, represented by database DB(2) 414 running on server 416, a corresponding SAS/ACCESS software for DB(2) 418 is used to access data. For purposes of this illustration, database DB(2) 414 is an Oracle database.

In one illustrative embodiment of the present invention, a user may desire to analyze data in DB(1) 402. In order to analyze data, a temporary dataset is created in Base SAS 410 and data is read from table 1 406 of DB(1) 402. The data is read from table 1 406 by executing a SAS procedure SQL statement to connect to DB(1) 402 and selecting all the data from table 1 406. The SAS procedure SQL statement is part of the SAS/ACCESS software for DB(1) 412. If data from more than one table is needed, such as table 3 422, an additional dataset is created and loaded with data from table 3 422. The above mechanism also requires a user to have a valid access right, such as a read access, to DB(1) 402 and a valid license to run Base SAS 410 and SAS/ACCESS software for DB(1) 412.

Once all necessary data is read from table 1 406 and table 3 422, Base SAS 410 merges both datasets into a single dataset and performs data preparation either before or after merging if necessary. One example of data preparation is adding one data value to another data value of the dataset. After data preparation is complete, the mechanism of the present invention executes a module that creates a new database table, such as table 2 424, in DB(1) 402 and loads data from the resulting dataset into table 2 424 through the use of SAS/ACCESS software for DB(1) 412.

In another illustrative embodiment of the present invention, instead of creating a new database table in DB(1) 402, a user may want to send the resulting output data to another type of database, DB(2) 414. In this case, the mechanism of the present invention executes a module to create a new database table, such as table 4 420 in DB(2) and loads data from the resulting dataset into table 4 420 through the use of SAS/ACCESS software for DB(2) 418.

Figure 5:
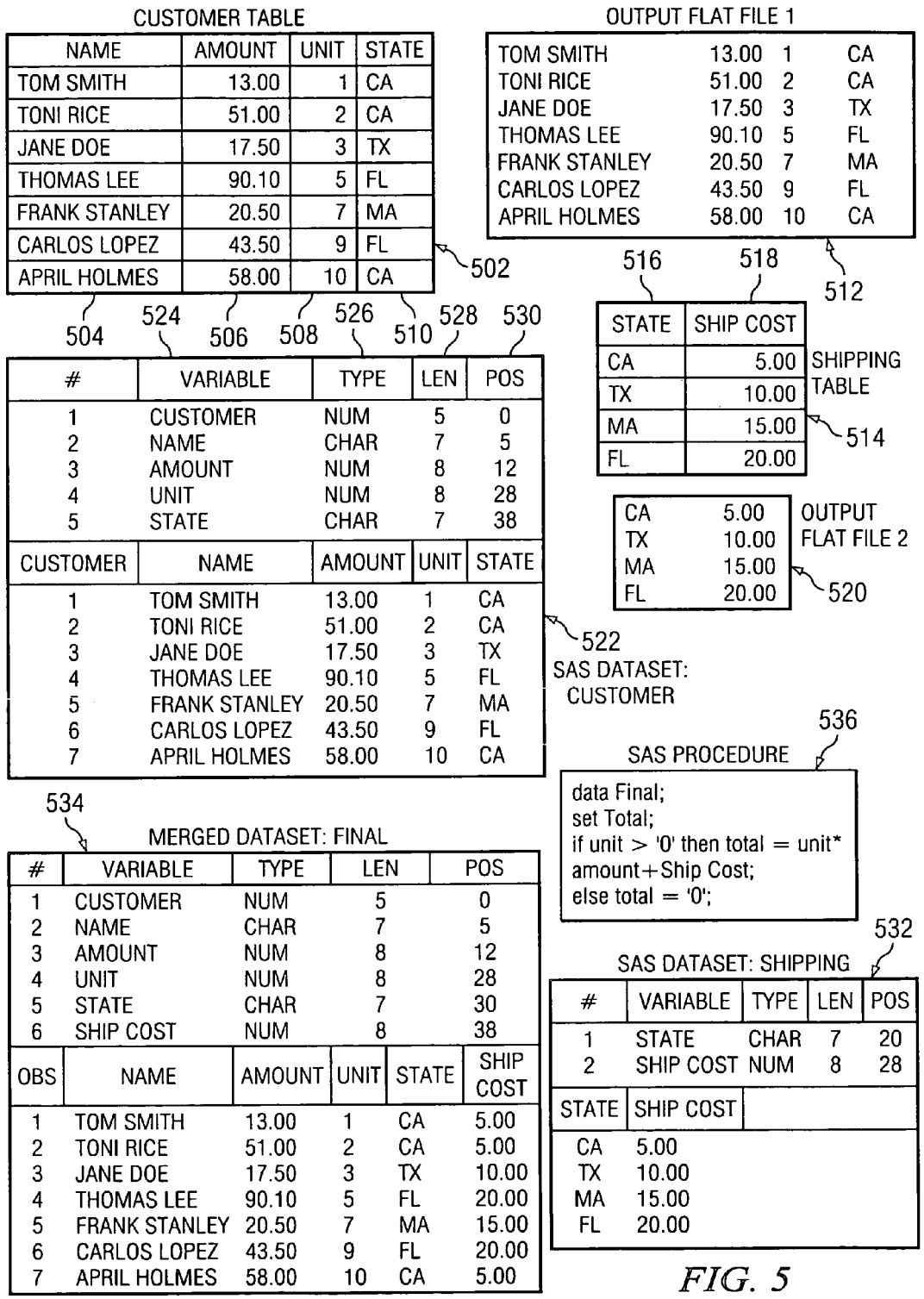
FIG. 5 is a diagram of database tables, datasets, and a SAS procedure used for direct linkage of relational database table for data preparation in accordance with a preferred embodiment of the present invention.

Turning next to FIG. 5, a diagram of example database tables, datasets, and a SAS procedure used for direct linkage of a relational database table for data preparation is depicted in accordance with a preferred embodiment of the present invention. As depicted in FIG. 5, customer table 502 includes table column name 504, amount 506, unit 508 and state 510. Each column includes data values associated with a customer. For example, an amount of 13.00, a unit of 1, and state 'CA' are associated with customer 'Tom Smith'.

Currently, the prior art approach to link data from a database table to a SAS data preparation tool involves the intermediate step of generating an output flat file that is, in turn, read in by SAS to create a SAS dataset. In this example, output flat file 1 512, is generated containing the data from customer table 502. A user writes code to read the data from customer table 502 and write the data to the output flat file 1 512. In this example, if data from another database is required for data analysis, another output flat file is generated and parsed by SAS to create another SAS dataset. Output flat file 2 520 is generated with data from shipping table 514, which includes column state 516 and ship cost 518. The generating of output flat files introduces extra steps that the user must perform in order to load data from the database tables.

In contrast, using the mechanism of the present invention, output flat files are not a necessary intermediate step to create SAS datasets. Data from database table, such as customer table 502, is read and dataset, such as SAS dataset customer 522, is created by a single set of SAS procedure statements according to an illustrative embodiment of the present invention. The extra steps are eliminated because the user is not required to write code to read and write the output flat files.

In addition to data values from customer table 502, SAS dataset customer 522 includes data descriptors that define characteristics of data values. For example, variable 524 defines names of data values, such as customer, name, amount, etc.; type 526 defines type of data values, such as number, character, date etc.; length 528 defines lengths of data values, such as 5 digit number or 7 characters, etc.; and pos 530 defines positions of data values in the dataset, such as position 0 for customer, position 5 for name, etc.

In this example, since data from shipping table 514 is also required, this data is read and SAS dataset shipping 532 is created by a single set of SAS procedure statements. SAS dataset shipping 532 is similar to SAS dataset 522, which includes data values and data descriptors. Once all data values are read from the database tables, customer table 502 and shipping table 514, SAS dataset customer 522 and shipping 532 are created from these tables. Then, both datasets are merged into a single dataset, merged dataset final 534.

Merged dataset final 534 includes data values from SAS dataset customer 522 and SAS dataset shipping 532. If data preparation is needed, SAS procedure 534 that prepares data from merged dataset final 536 is run to produce the desired output data. An example of data preparation includes calculating a total by multiplying the amount and the unit value and adding the result to ship cost.

Thus, the mechanism of the present invention allows for the direct linkage of one or more database tables, as well as the use of a data preparation tool, to create one or more datasets using data from database tables, without the use of output flat files and code written by the user.

Figure 6:
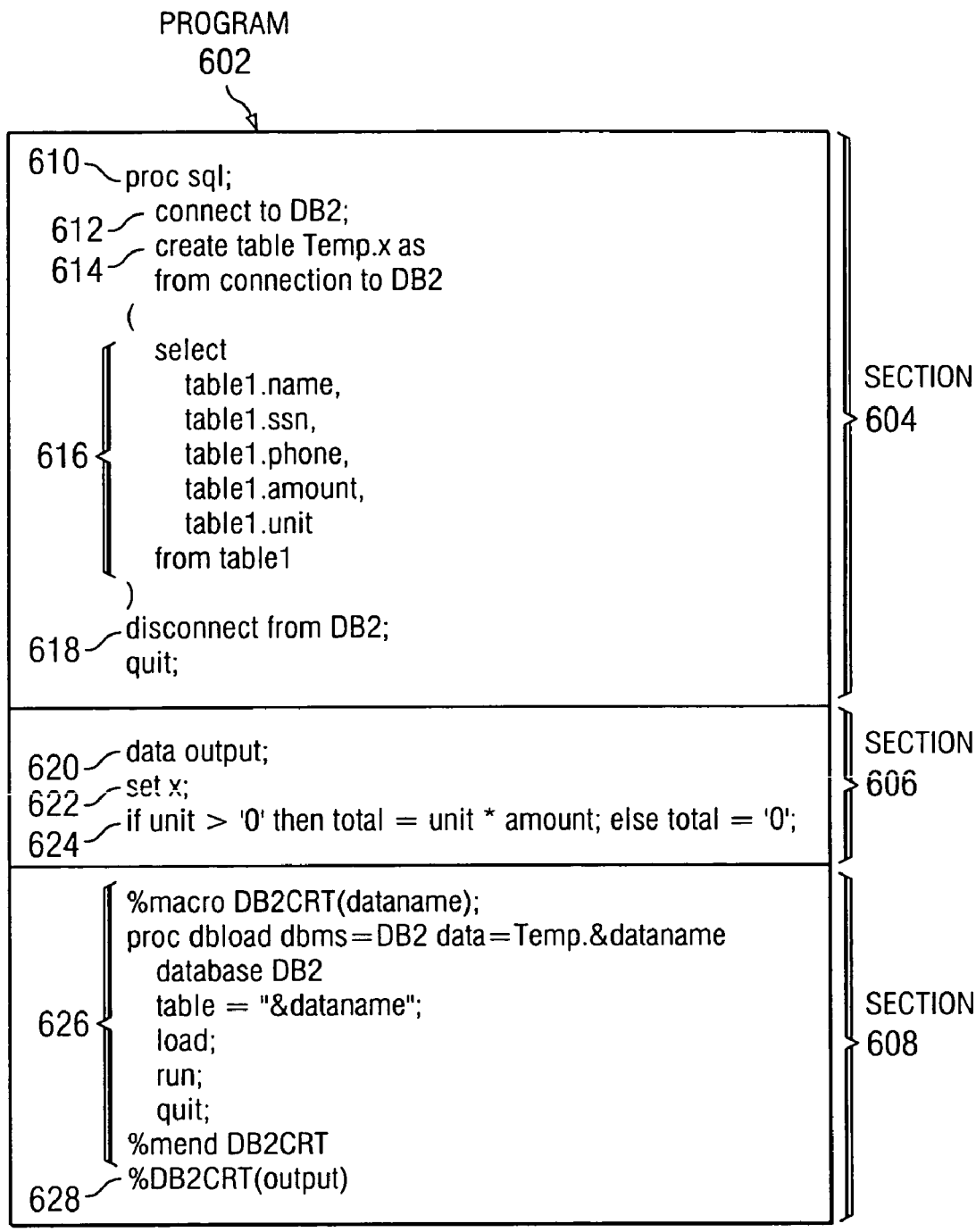
FIG. 6 is an example of a program used for the direct linkage of relational database table for data preparation in accordance with a preferred embodiment of the present invention.

Turning next to FIG. 6, a diagram of an example program used for the direct linkage of a relational database table for data preparation is depicted in accordance with a preferred embodiment of the present invention. As depicted in FIG. 6, program 602 includes section 604, section 606 and section 608. Section 604 includes a SAS procedure statement, PROC SQL statement 610, to connect to a database, DB2 612. Once the database is connected, a new temporary dataset Temp.x 614 is created with existing data from table 1 by selecting data from table 1 as shown in line 616. Table 1 includes data for columns such as name, amount, unit and State. Once the data is selected, connection to the database is disconnected in line 618. If data from other database table is required, the above PROC SQL statements are repeated for each additional database table to create additional temporary dataset. Once all the data is read from the database tables into one or more temporary datasets, the datasets are merged into a single dataset.

Next, in section 606 of program 602, the merged dataset is used for data preparation. The dataset name 'output' may be specified by the user using a data procedure statement, such as 'data output' in line 620. Next, data from temporary dataset x in line 622 is prepared by applying conditional logic in line 624. For example, if the value of 'unit' is greater than 0, variable 'total' of the dataset is equal to the value of 'unit' multiplied by the value of 'amount'. Otherwise, the value of 'total' is equal to 0.

Once the dataset named 'output' is prepared, section 608 includes procedure statements for defining a macro in section 626. For example, macro DB2CRT is defined with 'dataname' as an input parameter. In this example, 'dataname' represents the name of the dataset as well as the new database table name that will be created by running this macro. A PROC DBLOAD statement then creates a new database table and loads data from the input dataset into the new database table. Finally, macro DB2CRT is executed in line 628 with an input parameter, such as 'output', and the new database table named 'output' is created and loaded with data from dataset 'output'.

Figure 7:
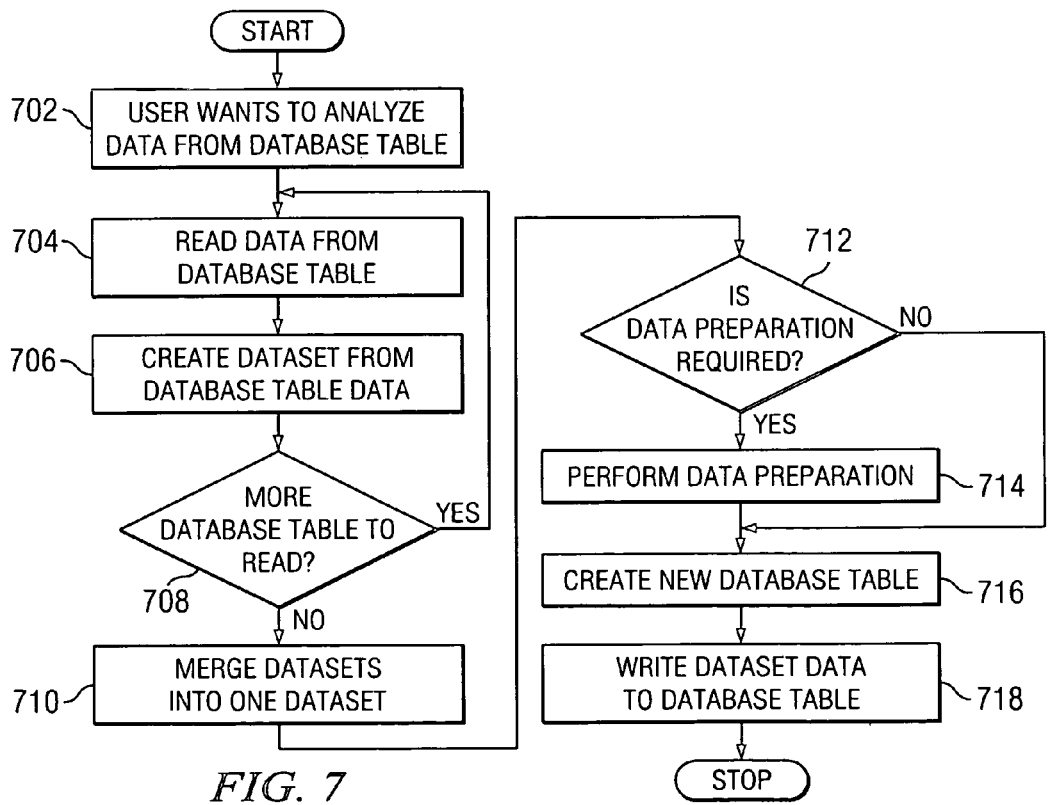
FIG. 7 is a flowchart illustrating the exemplary process for direct linkage of a relational database table for data preparation in accordance with a preferred embodiment of the present invention.

Turning next to FIG. 7, a flowchart illustrating exemplary process for direct linkage of a relational database table for data preparation is depicted in accordance with a preferred embodiment of the present invention. As depicted in FIG. 7, from the data preparation tool's perspective, the process begins when the user wants to analyze data from a relational database table (step 702). Next, data from the database table is read (step 704) through an interface, such as SAS/ACCESS software, and a temporary dataset is created from data of the database table (step 706).

A determination is then made as to whether additional database tables are present for reading (step 708). If additional database tables are present for reading, the process returns to step 704 to read another database table and create another temporary dataset (step 706). If no additional database tables are present for reading, datasets are merged into a single dataset (step 710).

A determination is then made as to whether data preparation is required to produce the desired output data (step 712). This determination is made through an indication provided by the user when data preparation section, such as section 606 of program 602 in FIG. 6, is added to the program. If necessary, data preparation is then performed (step 714). If the user does not want to prepare data, the user may delete the data preparation section of the program. Next, a new relational database table is created (step 716). This new database is created regardless of whether data preparation was performed in the previous step. Finally, data from the resulting single or prepared dataset is written to the newly created database table (step 718) with the process terminating thereafter.

Thus, the present invention provides a direct linkage of relational database table to a data preparation tool for data preparation. A single-step 'two-way' solution is provided by a single set of procedure statements that reads data from a database table into a dataset without the need of generating an output flat file.

The number of steps involved in accessing data from a relational database table to a data preparation tool is minimized using the mechanism of the present invention because the user is not required to write code to read and write output flat files. In the case of using data from multiple database tables, the mechanism of the present invention saves the user the significant time and effort required to move data from the database table to the data preparation tool. Furthermore, the mechanism of the present invention allows data from different types of databases to be linked directly through the use of SAS/ACCESS software interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data preparation program for transferring data in a data processing system, the method comprising:
   responsive to receiving user input, identifying data from a relational database and creating a temporary data set;
   reading data from a relational database table in the relational database into the temporary data set created in response to the user input;
   preparing the data read from the relational database table into the temporary data set to form prepared data for analysis;
   creating a database table in a data processing system for the relational database;
   storing the prepared data into the database table, wherein the prepared data is ready for analysis;
   responsive to additional user input identifying data located in a plurality of database tables, reading data from the plurality of database tables into a plurality of data sets;
   merging the data from the plurality of data sets into a single data set;
   preparing the data from the plurality of data sets to form additional prepared data; and
   storing the additional prepared data in the single data set into the database table.

2. The method of claim 1, wherein the merging step occurs after the step of preparing the data to form additional prepared data.

3. The method of claim 1, wherein a data set in the plurality of data sets includes values for a data object and variables defining characteristics of the data object.

4. The method of claim 1, wherein the temporary data set is a SAS data set.

5. The method of claim 1, wherein generation of output flat files is avoided.

6. The method of claim 1, wherein the user input is a query.

7. A data processing system in a data preparation program for transferring data in a data processing system, the data processing system comprising:
   identifying means, responsive to receiving user input, for identifying data from a relational database and creating a temporary data set;
   reading means for reading data from a relational database table in the relational database into the temporary data set created in response to the user input, wherein the reading means is a first reading means;
   preparing means for preparing the data read from the relational database table into the temporary data set to form prepared data for analysis, wherein the preparing means is a first preparing means;
   creating means for creating a database table in a data processing system for the relational database;
   storing means for storing the prepared data into the database table, wherein the prepared data is ready for analysis, wherein placing means is a first placing means;
   second reading means, responsive to additional user input identifying data located in a plurality of database tables, for reading data from the plurality of database tables into a plurality of data sets;
   merging means for merging the data from the plurality of data sets into a single data sets;
   second preparing means for preparing the data from the plurality of data sets to form additional prepared data; and
   second storing means for storing the additional prepared data in the single data set into the database table.

8. The data processing system of claim 7, wherein the merging means is initiated after initiating the second preparing means.

9. The data processing system of claim 7, wherein a data set in the plurality of data sets includes values for a data object and variables defining characteristics of the data object.

10. The data processing system of claim 7, wherein the temporary data set is a SAS data set.

11. The data processing system of claim 7, wherein generation of output flat files is avoided.

12. The data processing system of claim 7, wherein the user input is a query.

13. A computer program product in a computer readable recordable medium in a data preparation program for transferring data in a data processing system, the computer program product comprising:
   first instructions, responsive to receiving user input, for identifying data from a relational database and creating a temporary data set;
   second instructions for reading data from a relational database table in the relational database into the temporary data set created in response to the user input;
   third instructions for preparing the data read from the relational database table into the temporary data set to form prepared data for analysis;
   fourth instructions for creating a database table in a data processing system for the relational database;
   fifth instructions for placing the prepared data into the database table, wherein the prepared data is ready for analysis;
   sixth instructions responsive to a user input identifying data located in a plurality of database tables, for reading data from the plurality of database tables into a plurality of data sets;
   seventh instructions for merging the data from the plurality of data sets into a single data set;
   eighth instructions for preparing the data from the plurality of data sets to form additional prepared data; and
   ninth instructions for placing the additional prepared data in the single data set into the database table.

14. The computer program product of claim 13, wherein the seventh instructions are executed after the eighth instructions.

15. The computer program product of claim 13, wherein a data set in the plurality of data sets includes values for a data object and variables defining characteristics of the data object.

16. The computer program product of claim 13, wherein the temporary data set is a SAS data set.

17. The computer program product of claim 13, wherein generation of output flat files is avoided.

18. The computer program product of claim 13, wherein the user input is a query.

19. A data processing system comprising:
   a bus system;
   a memory connected to the bus system, wherein the memory includes a set of instructions; and
   a processing unit connected to the bus system, to identify data from a relational database and create a temporary data set, in response to receiving user input; read data from a relational database table in the relational database into the temporary data set created in response to the user input; prepare the data read from the relational database table into the temporary data set to form prepared data for analysis; create a database table in a data processing system for the relational database; store the prepared data into the database table, wherein the prepared data is ready for analysis; identify data located in a plurality of database tables, reading data from the plurality of database tables into a plurality of data sets, responsive to additional user input; merge the data from the plurality of data sets into a single data set; prepare the data from the plurality of data sets to form additional prepared data; and store the additional prepared data in the single data set into the database table.

* * * * *